(12) United States Patent  
Hauville

(10) Patent No.: US 8,460,441 B2
(45) Date of Patent: Jun. 11, 2013

(54) METHOD AND APPARATUS FOR OPERATING DUCTED FUMEHOODS WITH INCREASED ENERGY EFFICIENCY

(75) Inventor: Francois Hauville, Ipswich, MA (US)

(73) Assignee: FIPAK Research and Development Company, Rowley, MA (US)

( * ) Notice: Subject to any disclaimer, the term of this patent is extended or adjusted under 35 U.S.C. 154(b) by 7 days.

(21) Appl. No.: 12/949,611

(22) Filed: Nov. 18, 2010

(65) Prior Publication Data

US 2011/0179949 A1 Jul. 28, 2011

Related U.S. Application Data

(60) Provisional application No. 61/281,592, filed on Nov. 19, 2009.

(51) Int. Cl.
*B01D 46/00* (2006.01)

(52) U.S. Cl.
USPC ......... 95/273; 55/385.2; 55/467; 55/DIG. 18; 454/56

(58) Field of Classification Search
USPC ................. 55/385.2, 471, 472, 473; 454/187, 454/230, 232, 237, 246, 248
See application file for complete search history.

(56) References Cited

U.S. PATENT DOCUMENTS

| | | | |
|---|---|---|---|
| 6,102,977 A * | 8/2000 | Johnson | 55/385.2 |
| 7,300,483 B2 | 11/2007 | Hauville | |
| 7,357,831 B2 * | 4/2008 | Dancey et al. | 96/400 |
| 7,468,084 B2 * | 12/2008 | Bauer et al. | 55/385.2 |
| 7,591,867 B2 * | 9/2009 | Choi et al. | 55/385.2 |
| 7,857,880 B2 * | 12/2010 | Olander et al. | 55/385.2 |
| 2005/0039425 A1 * | 2/2005 | Olander et al. | 55/385.2 |
| 2005/0115213 A1 * | 6/2005 | Lim et al. | 55/385.2 |
| 2005/0160706 A1 * | 7/2005 | Kim et al. | 55/385.2 |
| 2006/0278215 A1 | 12/2006 | Gagas et al. | |
| 2006/0278216 A1 | 12/2006 | Gagas et al. | |
| 2007/0062167 A1 * | 3/2007 | Olander et al. | 55/385.2 |
| 2009/0211451 A1 | 8/2009 | Hauville | |
| 2009/0264060 A1 | 10/2009 | Livchak et al. | |
| 2011/0219953 A1 * | 9/2011 | Schreiber | 95/273 |

* cited by examiner

*Primary Examiner* — Duane Smith
*Assistant Examiner* — Minh-Chau Pham
(74) *Attorney, Agent, or Firm* — Pandiscio & Pandiscio

(57) ABSTRACT

A method for operating a ducted fumehood with increased energy efficiency, wherein the method includes passing exhaust air from the ducted fumehood through a heat exchanger, and passing other air through the heat exchanger, so as transfer heat content from the exhaust air to the other air, or to transfer heat content from the other air to the exhaust air, so as to temperature-condition the other air.

11 Claims, 6 Drawing Sheets

US 8,460,441 B2

METHOD AND APPARATUS FOR OPERATING DUCTED FUMEHOODS WITH INCREASED ENERGY EFFICIENCY

REFERENCE TO PENDING PRIOR PATENT APPLICATION

This patent application claims benefit of pending prior U.S. Provisional Patent Application Ser. No. 61/281,592, filed Nov. 19, 2009 by Francois Hauville for MODULAR FILTRATION ASSEMBLY, which patent application is hereby incorporated herein by reference.

FIELD OF THE INVENTION

This invention relates to air filtration systems in general, and more particularly to air filtration systems for purging hazardous substances from the air.

BACKGROUND OF THE INVENTION

Air filtration systems are used in many situations to purge unwanted substances from the air. Such filtration systems generally exist in a variety of forms, depending upon their function.

One type of air filtration system in common use, e.g., in laboratories, comprises a fumehood, fumehood is a protected enclosure for isolating a benchtop workspace from the ambient air of a laboratory, in order that dangerous substances may be handled safely within the fumehood without endangering nearby personnel.

Fumehoods may be ducted or ductless. With a ducted fumehood, the exhaust air from the fumehood is directed into building ductwork which leads to the outside atmosphere, with a filter being disposed intermediate the ductwork between the fumehood and the outside atmosphere. With a ductless fumehood, the exhaust air from the fumehood is directed into a filter which is attached directly to the fumehood, with the filter purging hazardous substances from the exhaust air before the exhaust air is directed back into the ambient air of the laboratory.

Ducted fumehoods offer certain advantages, e.g., multiple fumehoods can be exhausted through a single filter, their fixed location (a consequence of the fixed ductwork within a building) make them easy to oversee and administer, etc. However, ducted fumehoods also suffer from the disadvantage that the ambient air of the laboratory is exhausted through the fumehood to the outside atmosphere. As a result, heated air is lost from the laboratory during the winter, and cooled air is lost from the laboratory during the summer, thereby driving up energy costs. Ductless fumehoods do not suffer from this disadvantage, since they return the filtered exhaust air back to the ambient air of the laboratory. However, ductless fumehoods suffer from the disadvantage that each fumehood requires its own filter, which can complicate logistical issues such as filter monitoring, filter replacement, etc.

The present invention is directed to ducted fumehoods, and more particularly to a novel method and apparatus for operating ducted fumehoods with increased energy efficiency.

SUMMARY OF THE INVENTION

The present invention provides a novel method and apparatus for operating ducted fumehoods with increased energy efficiency.

More particularly, the present invention provides a novel method and apparatus for transferring heat content between the exhaust air of a fumehood and other air so as to temperature-condition that other air.

In one preferred form of the invention, there is provided a method for operating a ducted fumehood with increased energy efficiency, wherein the method comprises:

passing exhaust air from the ducted fumehood through a heat exchanger, and passing other air through the heat exchanger, so as transfer heat content from the exhaust air to the other air, or to transfer heat content from the other air to the exhaust air, so as to temperature-condition the other air.

In another form of the invention, there is provided apparatus for operating a ducted fumehood with increased energy efficiency, wherein the apparatus comprises:

a heat exchanger configured to receive exhaust air from the ducted fumehood, and to receive other air, so as to transfer heat content from the exhaust air to the other air, or to transfer heat content from the other air to the exhaust air, so as to temperature-condition the other air.

And in another form of the invention, there is provided a system comprising:

a ducted fumehood;

a heat exchanger configured to receive exhaust air from the ducted fumehood, and to receive other air, so as to transfer heat content from the exhaust air to the other air, or to transfer heat content from the other air to the exhaust air, so as to temperature-condition the other air.

BRIEF DESCRIPTION OF THE DRAWINGS

These and other objects and features of the present invention will be more fully disclosed or rendered obvious by the following detailed description of the preferred embodiments of the invention, which is to be considered together with the accompanying drawings wherein like numbers refer to like parts, and further wherein.

DETAILED DESCRIPTION OF THE PREFERRED EMBODIMENTS

Figure 1:
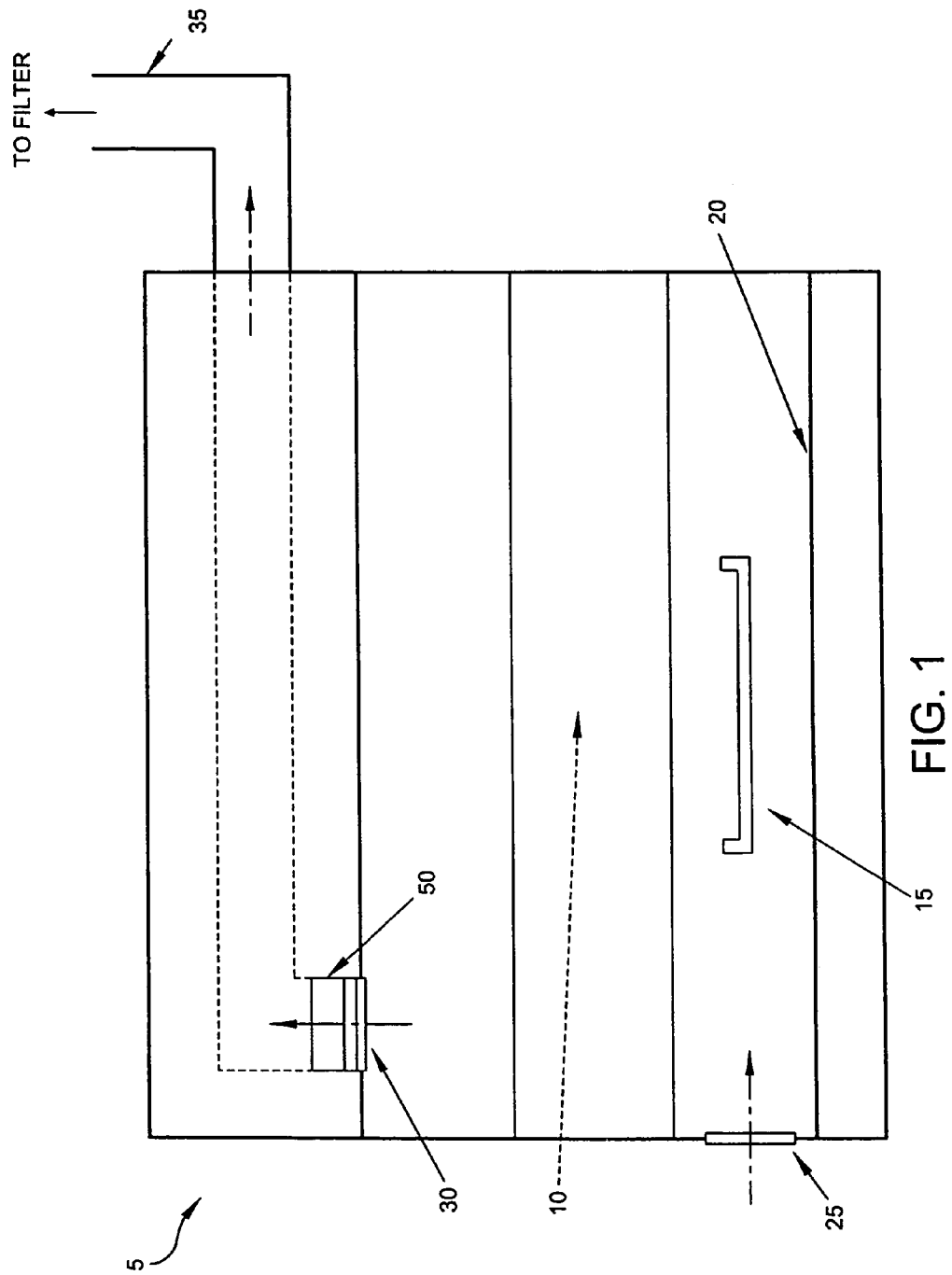
FIG. 1 is a schematic view showing a ducted fumehood.

Looking first at FIG. 1, there is shown a typical ducted fumehood 5. Ducted fumehood 5 generally comprises an enclosed workspace 10 accessed by a front door 15, with front door 15 engaging a sash 20 when the enclosed workspace is "sealed". An air inlet 25 admits ambient air from the laboratory into enclosed workspace 10, and an air outlet 30 removes exhaust air from enclosed workspace 10. The exhaust air from air outlet 30 is passed into ductwork 35, which in turn leads to a filter (not shown in FIG. 1) where the exhaust air is filtered before being vented to the outside atmosphere.

Figure 2:
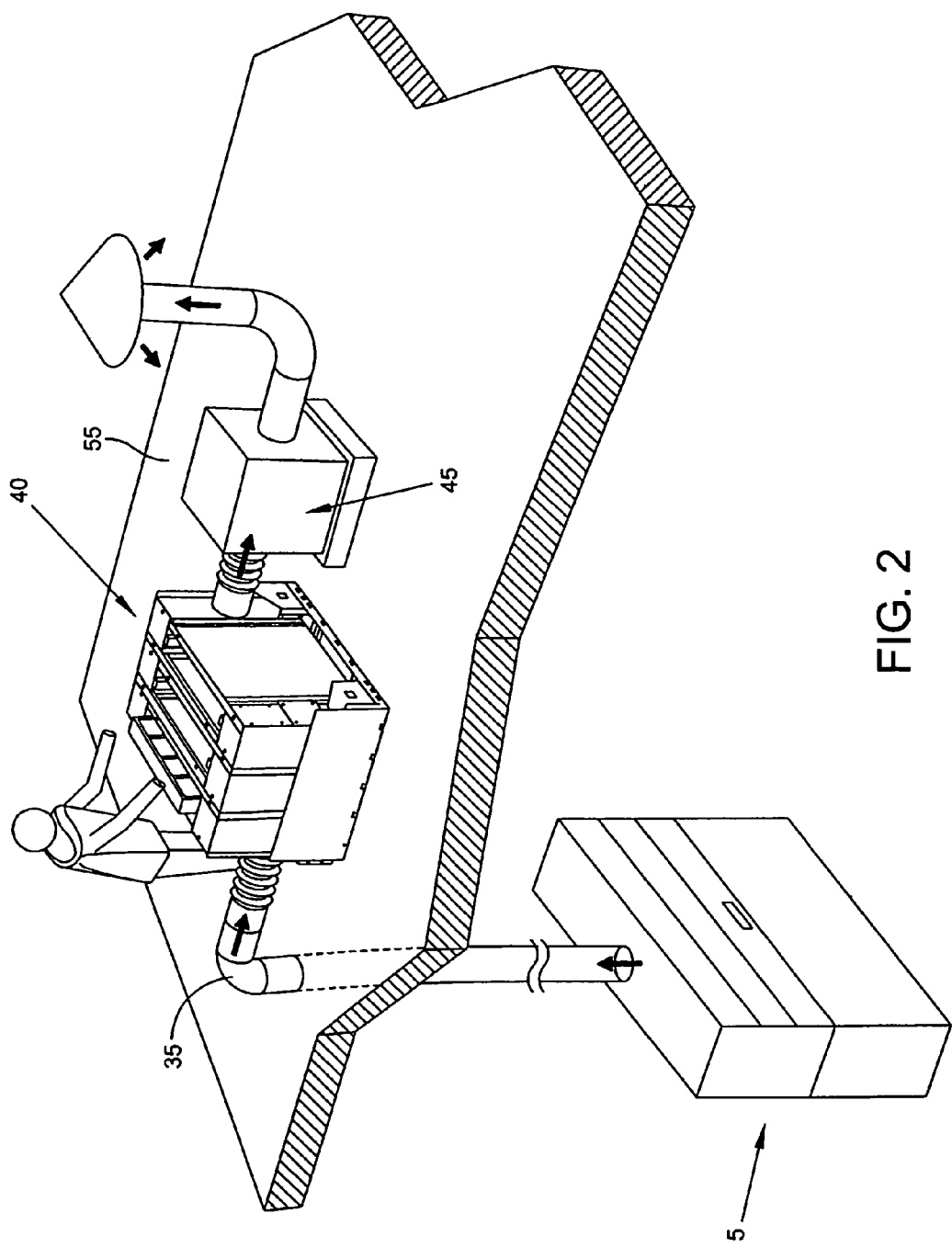
FIG. 2 is a schematic view showing, among other things, a ducted fumehood, a rooftop filter, and ductwork connecting the ducted fumehood to the rooftop filter.

More particularly, and looking now at FIG. 2, the exhaust air from ducted fumehood 5 is passed through ductwork 35 to a filter 40, where the exhaust air is filtered to remove hazardous substances from the exhaust air (thereby rendering the exhaust air safe) before the exhaust air is vented to the outside atmosphere. A suction fan 45 is provided downstream of filter 40 so as to draw the exhaust air out of fumehood 5 and through filter 40. In addition, an exhaust fan 50 (FIG. 1) is preferably also provided at the air outlet 30 of fumehood 5 so as to ensure that the enclosed workspace 10 of fumehood 5 is kept at a negative pressure differential relative to the ambient air of the laboratory, in order to ensure that any air within the enclosed workspace passes through filter 40 before being vented to the outside atmosphere.

In a typical installation, ducted fumehood 5 is located in a laboratory within a building, and filter 40 is disposed on the roof 55 (FIG. 2) of that building, with ductwork 35 connecting the output of ducted fumehood 5 to the input of filter 40, and with the output of filter 40 being vented to the outside atmosphere. Furthermore, in a typical installation, a plurality of fumehoods 5 are connected to the rooftop filter 40; however, in the figures, only one ducted fumehood 5 is shown connected to filter 40 in order to simplify the description.

It will be appreciated that, in relatively temperate climates, the room temperature of the laboratory (within which the fumehood is disposed) will be fairly close to the temperature of the outside atmosphere. In this situation, there will be relatively little energy loss from venting the temperature-conditioned air of the laboratory to the outside atmosphere and replacing the temperature-conditioned air of the laboratory with the non-temperature-conditioned air of the outside atmosphere.

However, in other climates, e.g., the continental United States and Europe, there is often a substantial difference between the temperature of the ambient air of the laboratory and the temperature of the outside atmosphere. In this situation, there can be a relatively significant energy loss from venting the temperature-conditioned air of the laboratory to the outside atmosphere and replacing the temperature-conditioned air of the laboratory with the non-temperature-conditioned air of the outside atmosphere.

By way of example but not limitation, in the continental United States and Europe, during winter, the temperature of the ambient air in the laboratory might be 22 degrees C. and the temperature of the outside air might be 0 degrees C. Correspondingly, during summer, the temperature of the air inside the laboratory might be 22 degrees C. and the temperature of the outside atmosphere might be 32 degrees C. In these circumstances, venting the "conditioned" air from inside the laboratory to the outside atmosphere can be highly energy inefficient, since additional energy is required in order to "condition" the new air (drawn from the outside atmosphere) before it is supplied to the laboratory.

Thus, in winter, venting heated laboratory air to the outside atmosphere "wastes" the heat content of the conditioned laboratory air and, in summer, venting the cooled laboratory air to the outside atmosphere "wastes" the "cool content" of the conditioned laboratory air.

By way of example but not limitation, in the continental United States and in Europe, it is common for each vented fumehood to add approximately $6,000-$8,000 to the cost of temperature conditioning (i.e., heating or cooling) the ambient air of the laboratory.

The present invention provides an extremely efficient and cost-effective means for transferring heat content between the exhaust air of a fumehood and other air so as to temperature-condition that other air.

Figure 3:
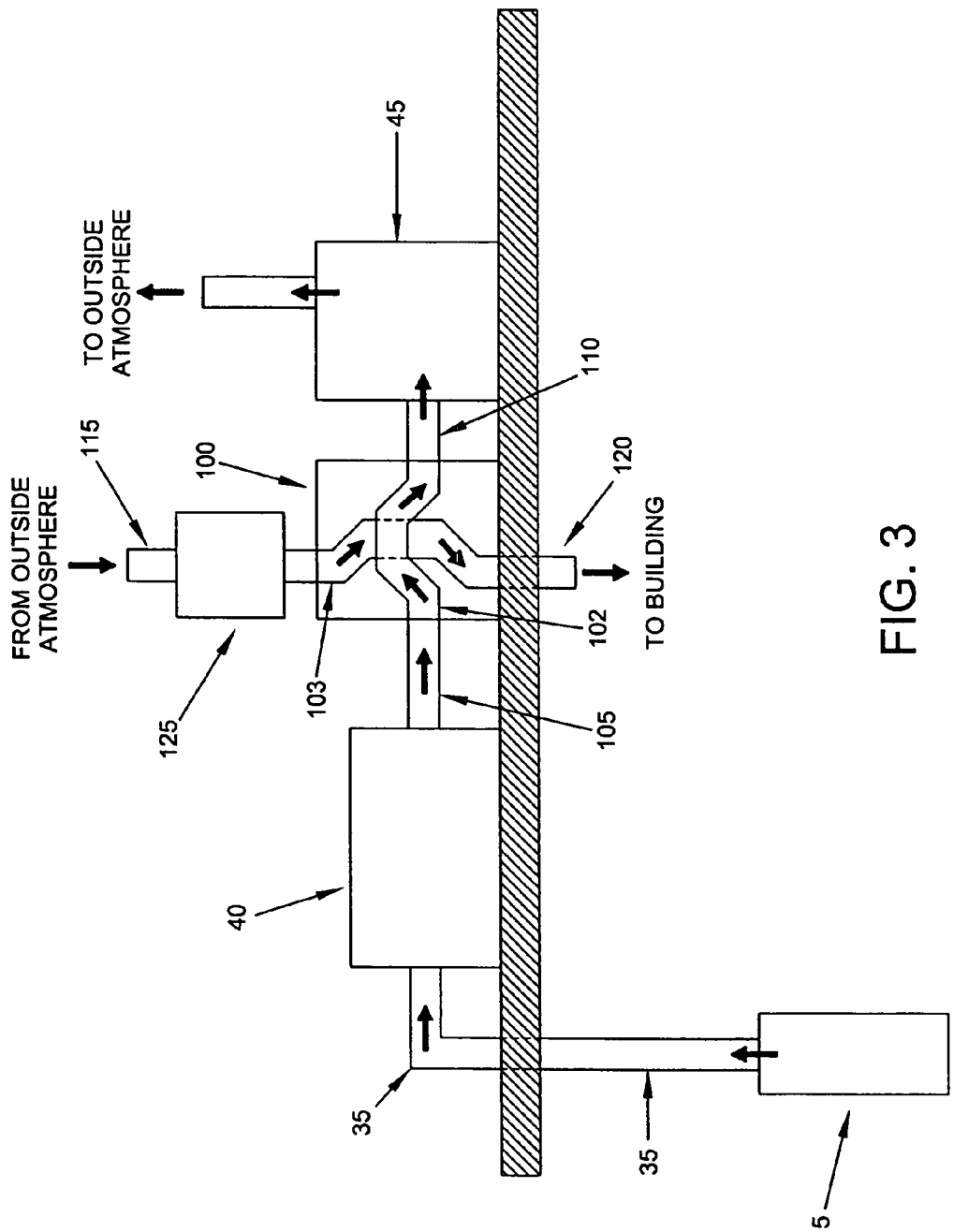
FIG. 3 is a schematic view showing the novel method and apparatus of the present invention, wherein a heat exchanger is used to transfer heat content between the exhaust air of a fumehood and other air so as temperature-condition that other air, whereby to temperature-condition the ambient air of the laboratory.

More particularly, and looking now at FIG. 3, in accordance with the present invention, a heat exchanger 100 is disposed between the output of filter 40 and the input to suction fan 45, i.e., before final venting of the exhaust air to the outside atmosphere. More particularly, heat exchanger 100 comprises a filtered air line 102 passing through the heat exchanger and a fresh air line 103 also passing through the heat exchanger. Filtered air line 102 and fresh air line 103 do not communicate with one another, i.e., the contents of the filtered air line do not mix with the contents of the fresh air line. However, filtered air line 102 and fresh air line 103 do permit the transfer of heat energy from one air line to the other air line.

More particularly, and still looking now at FIG. 3, filtered air line 102 comprises a first input line 105 which is connected to the output of filter 40, and a first output line 110 which is connected to the input of suction fan 45. Fresh air line 103 comprises a second input line 115 which draws fresh air from the outside atmosphere and a second output line 120 which supplies fresh air to the interior of the building. A blower fan 125 is connected to second input line 115 so as to draw fresh air into second input; line 115 and blow it out second output line 120.

Heat exchanger 100 transfers heat content between the heat exchanger's filtered air line 102 and the heat exchanger's fresh air line 103 so as to temperature condition (i.e., either warm or cool) the fresh air prior to introducing that fresh air into the building. In other words, heat exchanger 100 transfers heat energy between filtered air line 102 and fresh air line 103 so as to reduce the temperature differential between filtered air line 102 and fresh air line 103, whereby to temperature-condition the outside air before it is introduced into the laboratory.

Figure 4:
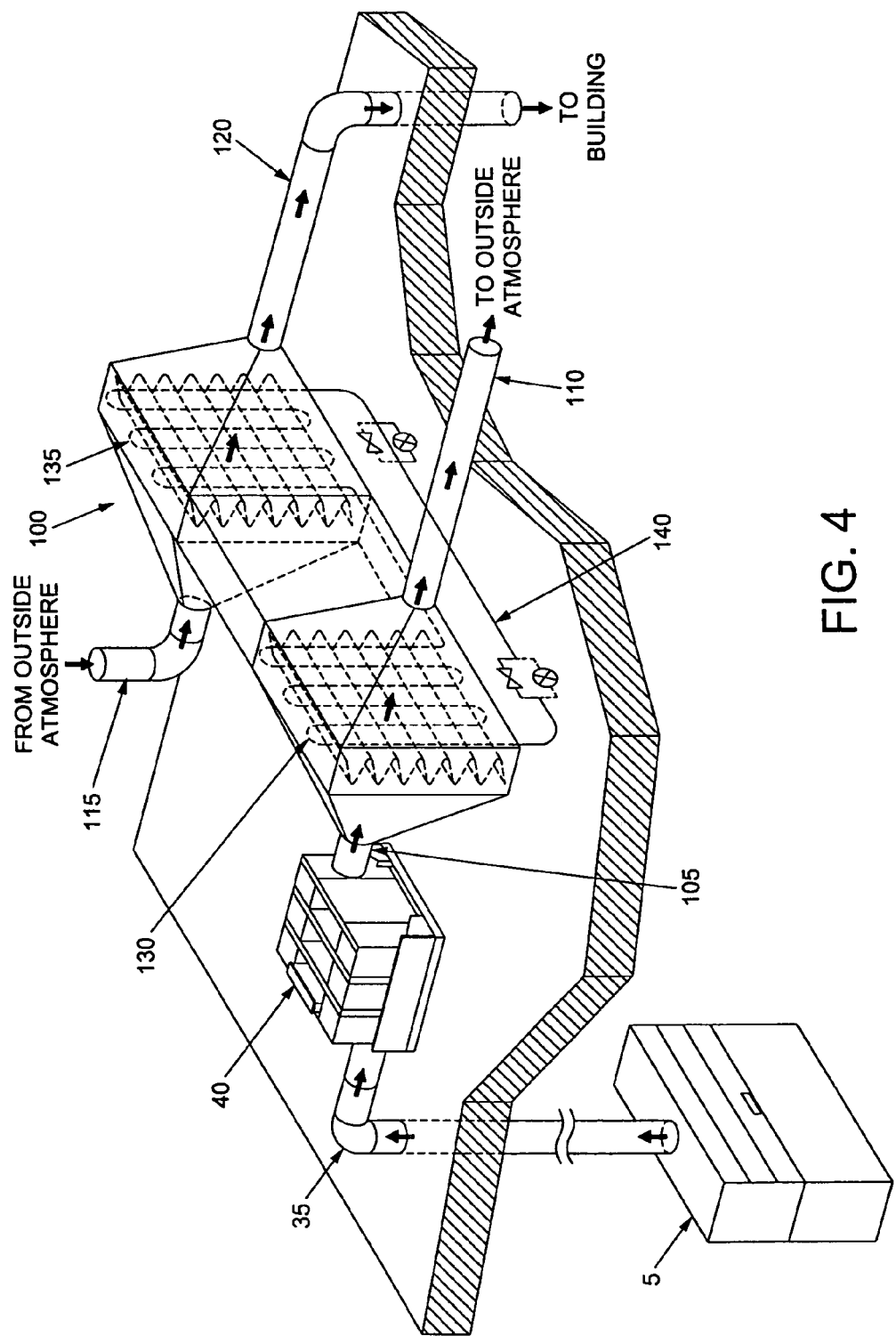
FIG. 4 is a schematic view showing details of a preferred form of the system of FIG. 3.

As noted above, the heat exchanger's filtered air line 102 and the heat exchanger's fresh air line 103 do not communicate with one another, i.e., the contents of the filtered air line do not mix with the contents of the fresh air line. However, filtered air line 102 and fresh air line 103 do permit the transfer of heat energy from one air line to the other air line. To this end, and looking now at FIG. 4, in one form of the present invention, heat exchanger 100 preferably comprises a first heat exchanger element 130 interposed in the airflow of filtered air line 102, and a second heat exchanger element 135 interposed in the airflow of fresh air line 103, with first heat exchanger element 130 being connected to second heat exchanger element 135 by means of a fluid line 140. In this construction, first heat exchanger element 130 transfers heat content between the heat exchanger's filtered air line 102 and the heat exchanger's fresh air line 103, whereby to temperature condition the fresh air before the fresh air enters the building.

It should be noted that it is generally preferable to position the heat exchanger after the filter, rather than before the filter, so that harmful substances can be removed from the exhaust air of the fumehood before those harmful substances reach the heat exchanger. This will protect the heat exchanger from any damage that could occur due to contact with harmful substances contained in the exhaust air. Thus it will be appreciated that the filter will serve two purposes: first, to remove unwanted substances from the exhaust air so that those unwanted substances are not vented to the outside atmosphere, and second, to protect the heat exchanger from contact with harmful substances.

In one preferred form of the present invention, heat exchanger 100 comprises a reversible heat pump 100A. More particularly, and looking now at FIGS. 5 and 6, the reversible heat pump 100A comprises the first heat exchanger element 130 disposed in the airflow of filtered air line 102, and the second heat exchanger element 135 disposed in the airflow of fresh air line 103. A compressor 145 circulates refrigerant through a refrigerant line 140. More particularly, refrigerant line 140 passes by first heat exchanger element 130 so as to exchange heat therewith and passes by second heat exchanger element 135 so as to exchange heat therewith. The reversible heat pump 100A also comprises a reversing valve 150 for reversing the flow of refrigerant through refrigerant line 140. Reversible heat pump 100A preferably also comprises a pair of thermal expansion valves 155 and a pair of bypass valves 160 in refrigerant line 140.

Figure 5:
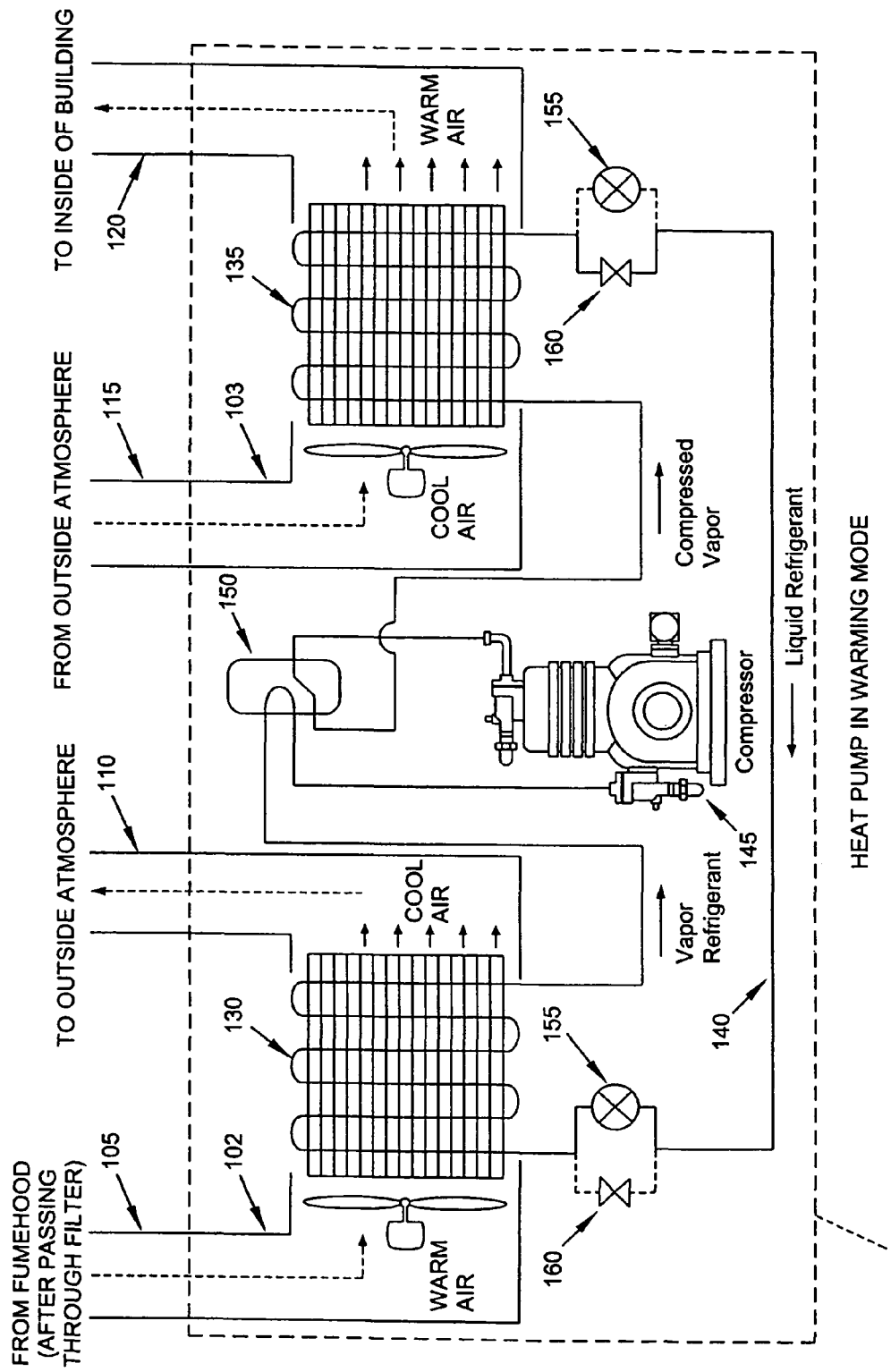
FIG. 5 is a schematic view showing one preferred form of the present invention, wherein the heat exchanger comprises a reversible heat pump, and further wherein the reversible heat pump is configured to recover heat from the exhaust air of the fumehood and return the recovered heat to the ambient air of the laboratory.
Figure 6:
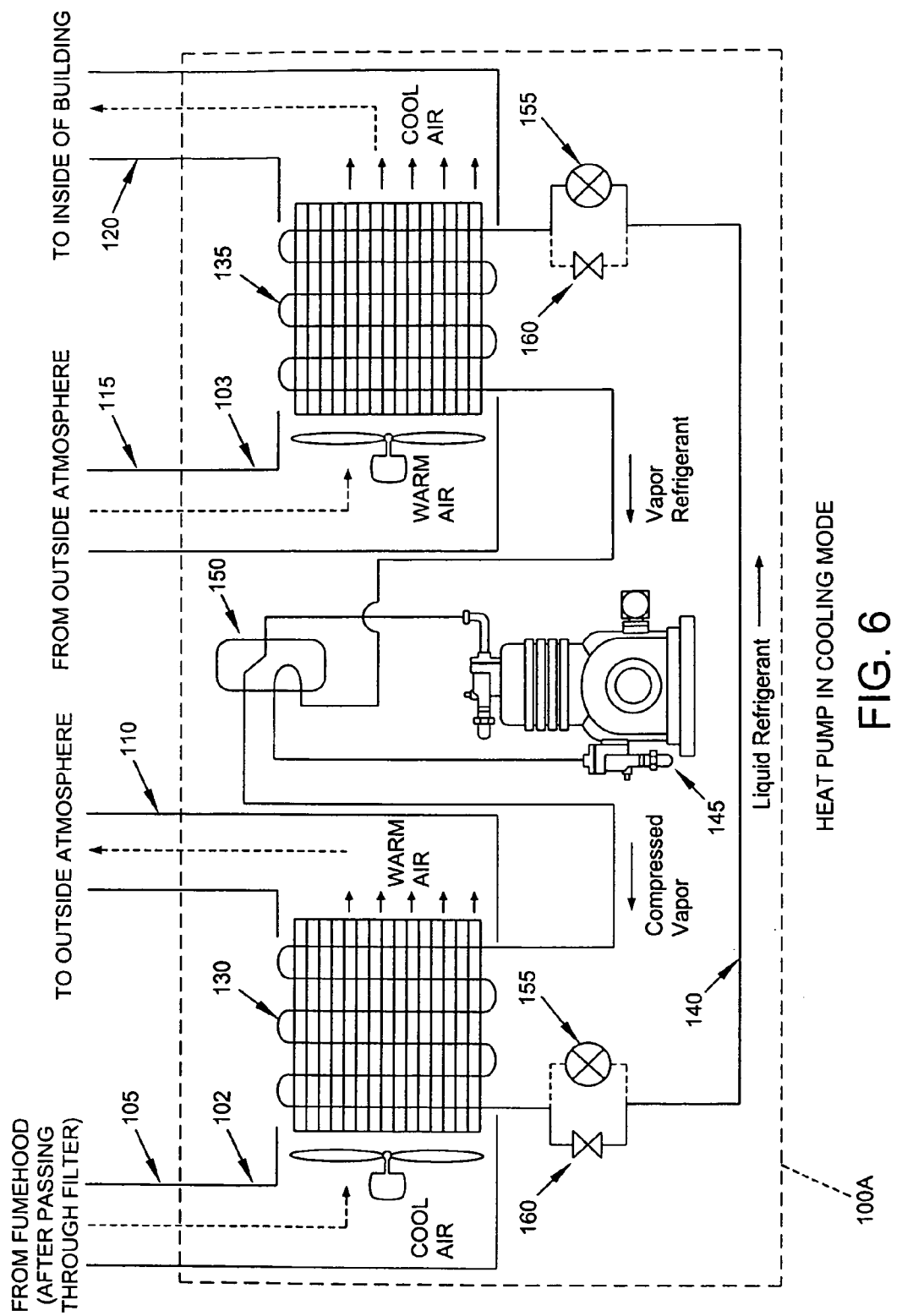
FIG. 6 is a schematic view showing the same system as FIG. 5, except that the reversible heat pump is configured to transfer heat content from other air to the exhaust air of the fumehood so as to temperature-condition that other air, whereby to temperature-condition the ambient air of the laboratory.

FIGS. 5 and 6 illustrate operation of the reversible heat pump assembly 100A during heating and cooling modes, respectively.

More particularly, in FIG. 5, reversing valve 150 is set to extract heat content from the filtered air line 102 and transfer that heat content to the fresh air line 103, whereby to heat fresh air line 103.

In FIG. 6, reversing valve 150 is set to extract heat content from fresh air line 103 and transfer that heat content to filtered air line 102, whereby to cool fresh air line 103.

Significantly, because the reversible heat pump 100A is designed to transfer heat content to and from filtered air line 102, and because filtered air line 102 contains air which has a temperature which is very close to room temperature, the reversible heat pump is always working off air that is approximately 22 degrees C. This makes for very efficient energy recapture from the filtered air line, and allows for the use of smaller and more efficient reversible heat pumps. It is believed that as much as 90% of the thermal energy in the filtered air line can be recaptured through the use of a reversible heat pump.

MODIFICATIONS

It is to be understood that the present invention is by no means limited to the particular constructions herein disclosed and/or shown in the drawings, but also comprises any modifications or equivalents within the scope of the invention.

What is claimed is:

1. A method for operating a ducted fumehood with increased energy efficiency, wherein the ducted fumehood is located within a temperature-conditioned room of a building, and further wherein exhaust air from the ducted fumehood is passed from the ducted fumehood to the atmosphere outside of the building, the method comprising:
    drawing temperature-conditioned air into the ducted fumehood from the temperature-conditioned room of the building;
    passing exhaust air from inside the ducted fumehood through a filter, through a heat exchanger and into the atmosphere outside of the building, and passing fresh air from the atmosphere outside of the building through the heat exchanger and into the room containing the ducted fumehood, the heat exchanger being configured so as to cause heat content to be transferred between the exhaust air of the ducted fumehood and the fresh air from the atmosphere outside of the building without the exhaust air from the ducted fumehood mixing with the fresh air from the atmosphere outside of the building, whereby to temperature-condition the fresh air from the atmosphere outside of the building before it is introduced into the room containing the ducted fumehood;
    wherein the heat exchanger comprises a reversible heat pump comprising a first heat exchanger element for contacting the exhaust air from the ducted fumehood, a second heat exchanger element for contacting the fresh air from the atmosphere outside of the building, and a refrigerant line connecting the first heat exchanger element with the second heat exchanger element, whereby to permit heat content to be transferred between the first heat exchanger element and the second heat exchanger element, and hence between the exhaust air from the ducted fumehood and the fresh air from the atmosphere outside of the building.

2. A method according to claim 1 wherein the refrigerant line is filled with a refrigerant, and further wherein the reversible heat pump further comprises a compressor for selectively compressing the refrigerant.

3. A method according to claim 2 wherein the reversible heat pump further comprises reversing valve disposed in the refrigerant line.

4. A method according to claim 1 wherein the reversible heat pump extracts heat content from the filtered exhaust air and adds that heat content to the fresh air by directing liquid refrigerant from the first heat exchanger element toward the second heat exchanger element.

5. A method according to claim 1 wherein the reversible heat pump extracts heat content from the fresh air and adds that heat content to the filtered exhaust air by directing liquid refrigerant from the second heat exchanger element toward the first heat exchanger element.

6. Apparatus for operating a ducted fumehood with increased energy efficiency, wherein the ducted fumehood is located within a temperature-conditioned room of a building, and further wherein exhaust air from the ducted fumehood is passed from the ducted fumehood to the atmosphere outside of the building, the apparatus comprising:
    a fan for drawing temperature-conditioned air into the ducted fumehood from the temperature-conditioned room of the building;
    a filter for receiving exhaust air from inside the ducted fumehood;
    a heat exchanger configured to receive filtered exhaust air from the filter and pass the filtered exhaust air into the atmosphere outside of the building, and to receive fresh air from the atmosphere outside of the building and pass the fresh air from the atmosphere outside of the building into the room containing the ducted fumehood, the heat exchanger being configured so as to cause heat content to be transferred between the exhaust air of the ducted fumehood and the fresh air from the atmosphere outside of the building without the exhaust air from the ducted fumehood mixing with the fresh air from the atmosphere outside of the building, whereby to temperature-condition the fresh air from the atmosphere outside of the building before it is introduced into the room containing the ducted fumehood;
    wherein the heat exchanger comprises a reversible heat pump comprising a first heat exchanger element for contacting the exhaust air from the ducted fumehood, a second heat exchanger element for contacting the fresh air from the atmosphere outside of the building, and a refrigerant line connecting the first heat exchanger element with the second heat exchanger element, whereby to permit heat content to be transferred between the first heat exchanger element and the second heat exchanger element, and hence between the exhaust air from the ducted fumehood and the fresh air from the atmosphere outside of the building.

7. Apparatus according to claim 1 wherein the refrigerant line filled with a refrigerant, and further wherein the reversible heat pump further comprises a compressor for selectively compressing the refrigerant.

8. Apparatus according to claim 7 wherein the reversible heat pump further comprises a reversing valve disposed in the refrigerant line.

9. Apparatus according to claim 8 wherein the reversible heat pump extracts heat content from the filtered exhaust air and adds that heat content to the fresh air by directing liquid refrigerant from the first heat exchanger element toward the second heat exchanger element.

10. Apparatus according to claim 8 wherein the reversible heat pump extracts heat content from the fresh air and adds that heat content to the filtered exhaust air by directing liquid refrigerant from the second heat exchanger element toward the first heat exchanger element.

11. A system comprising:
   a ducted fumehood located within a temperature-conditioned room of a building;
   a fan for drawing temperature-conditioned air into the ducted fumehood from the temperature-conditioned room of the building;
   a filter for receiving exhaust air from inside the ducted fumehood;
   a heat exchanger configured to receive filtered exhaust air from the filter and pass the filtered exhaust air and into the atmosphere outside of the building, and to receive fresh air from the atmosphere outside of the building and pass the fresh air from the atmosphere outside of the building into the room containing the ducted fumehood, the heat exchanger being configured so as to cause heat content to be transferred between the exhaust air of the ducted fumehood and the fresh air from the atmosphere outside of the building without the exhaust air from the ducted fumehood mixing with the fresh air from the atmosphere outside of the building, whereby to temperature-condition the fresh air from the atmosphere outside of the building before it is introduced into the room containing the ducted fumehood;
   wherein the heat exchanger comprises a reversible heat pump comprising a first heat exchanger element for contacting the exhaust air from the ducted fumehood, a second heat exchanger element for contacting the fresh air from the atmosphere outside of the building, and a refrigerant line connecting the first heat exchanger element with the second heat exchanger element, whereby to permit heat content to be transferred between the first heat exchanger element and the second heat exchanger element, and hence between the exhaust air from the ducted fumehood and the fresh air from the atmosphere outside of the building.

* * * * *